United States Patent
Ho et al.

(10) Patent No.: US 11,652,362 B2
(45) Date of Patent: May 16, 2023

(54) OFF-LINE UNINTERRUPTIBLE POWER SYSTEM AND LINE-INTERACTIVE UNINTERRUPTIBLE POWER SYSTEM

(71) Applicant: CYBER POWER SYSTEMS, INC., Taipei (TW)

(72) Inventors: Lien-Hsun Ho, Taipei (TW); Shou-Ting Yeh, Taipei (TW); Jui-Hung Chou, Taipei (TW); Kai-Tsung Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 281 days.

(21) Appl. No.: 16/719,198

(22) Filed: Dec. 18, 2019

(65) Prior Publication Data

US 2021/0194277 A1    Jun. 24, 2021

(51) Int. Cl.
*H02J 9/06* (2006.01)
*H02J 7/02* (2016.01)

(52) U.S. Cl.
CPC ............... *H02J 9/068* (2020.01); *H02J 7/02* (2013.01); *H02J 9/062* (2013.01); *H02J 2207/20* (2020.01)

(58) Field of Classification Search
CPC ... H02J 9/06; H02J 7/007; G06F 1/26; H02M 7/2176; H02M 5/2573
See application file for complete search history.

(56) References Cited

U.S. PATENT DOCUMENTS

| | | | | |
|---|---|---|---|---|
| 6,201,371 B1* | 3/2001 | Kawabe | ............... | H02J 9/062 320/121 |
| 8,946,930 B2* | 2/2015 | Yu | ............... | H02J 9/00 307/64 |
| 2009/0289611 A1* | 11/2009 | Mangtani | ............... | G05F 1/565 323/283 |
| 2013/0076141 A1* | 3/2013 | Paulakonis | ............... | H02J 9/062 307/64 |
| 2014/0183958 A1* | 7/2014 | Yeh | ............... | H02J 9/062 307/66 |

* cited by examiner

*Primary Examiner* — Elim Ortiz
(74) *Attorney, Agent, or Firm* — Bacon & Thomas, PLLC

(57) ABSTRACT

An off-line uninterruptible power system and two line-interactive uninterruptible power systems are provided. The off-line uninterruptible power system and one of the line-interactive uninterruptible power systems additionally adopt a transformer for supplying an AC output, with lower voltage level than a rated output voltage, to at least one electrical device (especially those with resistive load characteristic). The other line-interactive uninterruptible power system controls its automatic voltage regulating circuit to supply an AC output, with lower voltage level than a rated output voltage, to at least one electrical device (especially those with resistive load characteristic).

13 Claims, 6 Drawing Sheets

OFF-LINE UNINTERRUPTIBLE POWER SYSTEM AND LINE-INTERACTIVE UNINTERRUPTIBLE POWER SYSTEM

BACKGROUND OF THE INVENTION

Field of the Invention

The present invention relates to the technical field of uninterruptible power system, and more particularly, to an off-line uninterruptible power system and a line-interactive uninterruptible power system.

Description of Related Art

Circuit breakers are designed to protect you, your family, your home and your office. If a circuit breaker trips, it means there was too much current flowing through that particular circuit breaker. For example, a 15 Amp circuit breaker will trip when more than 15 Amps of current are flowing through it.

Once a circuit breaker trips, the power outlets associated with it will be powered down. This means that the electrical devices associated with these power outlets will be inoperable. For example, when these electrical devices (such as laser printers) are perforating an important task (such as printing ballots) at the same time, the electrical devices printing ballots may draw high current instantaneously, and may consequently cause the circuit breaker trips. When these electrical devices are inoperable, the important task will be delayed or even impossible to complete.

SUMMARY OF THE INVENTION

An object of the present invention is to provide an off-line uninterruptible power system, which can be electrically coupled between a circuit breaker and at least an electrical device to prevent the circuit breaker from tripping.

Another object of the present invention is to provide a line-interactive uninterruptible power system, which can be electrically coupled between a circuit breaker and at least an electrical device to prevent the circuit breaker from tripping.

To achieve the above object, the present invention provides an off-line uninterruptible power system. The off-line uninterruptible power system comprises a battery, a switch wilt, a charging circuit, a first output terminal, a second output terminal, a DC-AC conversion circuit, a control circuit and a transformer. The switch unit is electrically coupled to an AC power source and a terminal of a bypass path. The charging circuit is electrically coupled to the AC power source and the battery. The first output terminal is electrically coupled to the other terminal of the bypass path. The DC-AC conversion circuit is electrically coupled between the battery and the first output terminal. The control circuit is electrically coupled to the switch unit, the charging circuit and the DC-AC conversion circuit for controlling their operations. The transformer is configured to receive a first AC output from the first output terminal and accordingly generate a second AC output to the second output terminal, wherein the voltage level of the second AC output is less than the voltage level of the first AC output.

To achieve the above another object, the present invention provides a line-interactive uninterruptible power system. The line-interactive uninterruptible power system comprises a first output terminal, a second output terminal, a battery, a switch unit, an automatic voltage regulating circuit, a charging circuit, a DC-AC conversion circuit, a control circuit and a transformer. The switch unit is electrically coupled to an AC power source. The automatic voltage regulating circuit is electrically coupled between the switch unit and the first output terminal. The charging circuit is electrically coupled to the AC power source and the battery. The DC-AC conversion circuit is electrically coupled between the battery and the first output terminal. The control circuit is electrically coupled to the switch unit, the charging circuit, the DC-AC conversion circuit and the automatic voltage regulating circuit for controlling their operations. The transformer is configured to receive a first AC output from the first output terminal and accordingly generate a second AC output to the second output terminal, wherein the voltage level of the second AC output is less than the voltage level of the first AC output.

To achieve the above another object, the present invention provides a line-interactive uninterruptible power system. The line-interactive uninterruptible power system comprises an output terminal, a battery, a switch unit, an automatic voltage regulating circuit, a charging circuit, a DC-AC conversion circuit and a control circuit. The switch unit is electrically coupled to an AC power source. The automatic voltage regulating circuit is electrically coupled between the switch unit and the output terminal. The charging circuit is electrically coupled to the AC power source and the battery. The DC-AC conversion circuit is electrically coupled between the battery and the output terminal. The control circuit is electrically coupled to the switch unit, the charging circuit, the DC-AC conversion circuit and the automatic voltage regulating circuit for controlling their operations. When the control circuit enters a special mode, the control circuit controls the switch unit to electrically couple the automatic voltage regulating circuit to the AC power source, disables the DC-AC conversion circuit, and forces the automatic voltage regulating circuit to enter a buck mode, so that the voltage level of the output of the automatic voltage regulating circuit is less than the voltage level of the input of the automatic voltage regulating circuit.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein, it must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
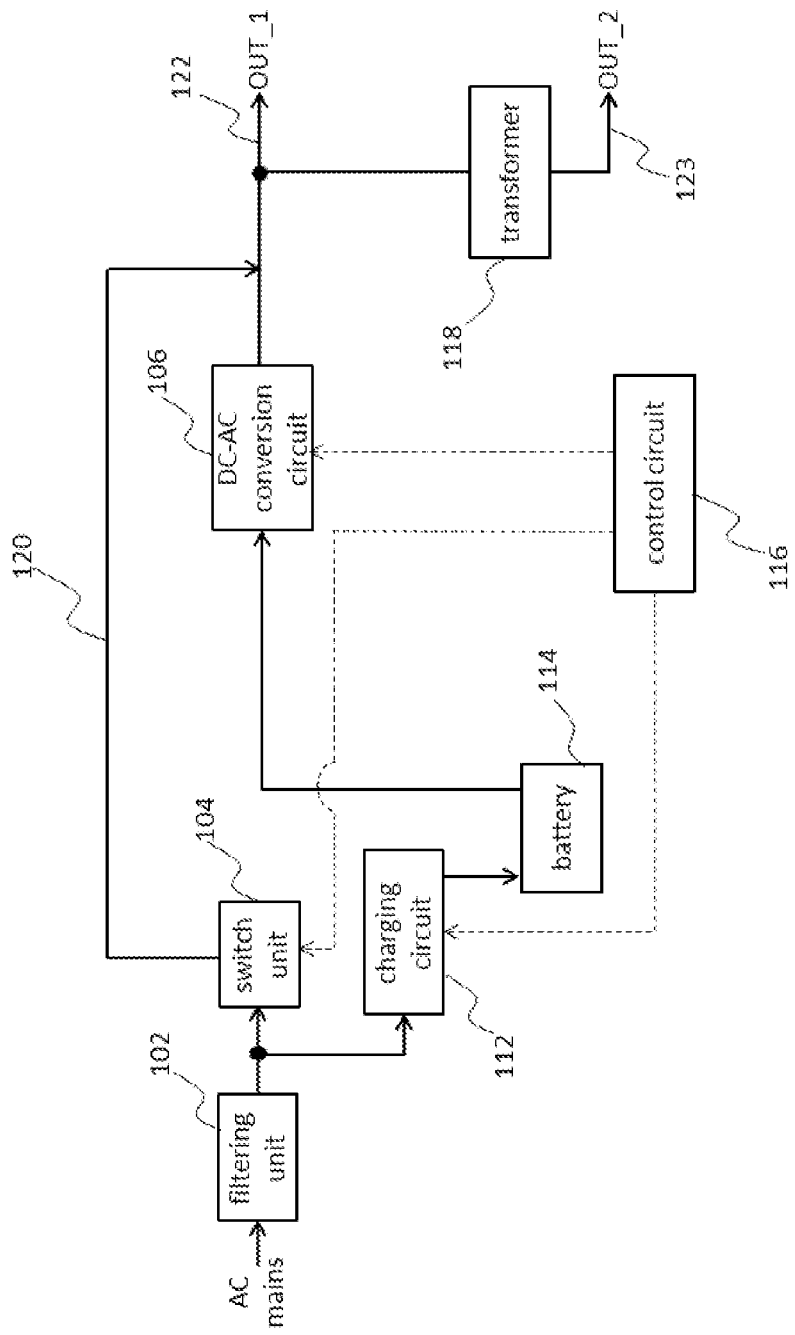
FIG. 1 shows an off-line uninterruptible power system according to an embodiment of the present invention.

FIG. 1 shows an off-line uninterruptible power system according to an embodiment of the present invention. Referring to FIG. 1, the of uninterruptible power system comprises a filtering unit 102, a switch unit 104, a DC-AC conversion circuit 106, a charging circuit 112, a battery 114, a control circuit 116, a transformer 118, an output terminal 122 and an output terminal 123. The switch unit 104 is electrically coupled to a terminal of a bypass path 120, and is electrically coupled to an AC power source (e.g., 120V AC mains) through the filtering unit 102 and a circuit breaker (e.g., a 15 Amp circuit breaker, not shown) sequentially. The charging circuit 112 is electrically coupled to the battery 114, and is electrically coupled to the AC power source through the filtering unit 102 and the circuit breaker sequentially. The charging circuit 112 can be a boost charging circuit, a buck charging circuit or a buck-boost charging circuit. For example, the input voltage, the input current, the output voltage and the output current of the charging circuit 112 can be 120V, 1 Amp, 300V and 0.4 Amp, respectively. For another example, the input voltage, the input current, the output voltage and the output current of the charging circuit 102 can be 120V, 1 Amp, 12V and 10 Amps, respectively.

The output terminal 122 is electrically coupled to the other terminal of the bypass path 120, and is configured for outputting an AC output OUT_1 with rated output voltage such as 120V. The DC-AC conversion circuit 106 is electrically coupled between the battery 114 and the output terminal 122. The control circuit 116 is electrically coupled to the switch unit 104, the charging circuit 112 and the DC-AC conversion circuit 106 for controlling their operations. The transformer 118 is electrically coupled between the output terminal 122 and the output terminal 123, and is configured to receive the AC output OUT_1 from the output terminal 122 and accordingly generate an AC output OUT_2 to the output terminal 123, wherein the voltage level of the AC output OUT_2 is less than the voltage level of the AC output OUT_1. For example, the voltage level of the AC output OUT_2 can be 5%-30% less than the voltage level of the AC output OUT_2. In this embodiment, the voltage level of the AC output OUT_2 is 106V. The output terminal 123 is configured for supplying the AC output OUT_2, with lower voltage level than the said rated output voltage, to at least one electrical device (especially those with resistive load characteristic such as laser printers, not shown).

Assume that the AC output OUT_2 still makes the electrical device with resistive load characteristic operate normally. Since the voltage level of the AC output OUT_2 is lower than the rated output voltage, and the resistance of the said electrical device is constant, the said electrical device draws lesser current from the output terminal 123 (compared with the case that the said electrical device is electrically coupled to the output terminal 122), thereby preventing the circuit breaker from tripping. The relationship of the input voltage and the input current of the said electrical device can be seen from the following equation 1:

$$V = I \times R \quad (1)$$

where V, I and R are the input voltage, the input current and the resistance of the electrical device, respectively.

Figure 2:
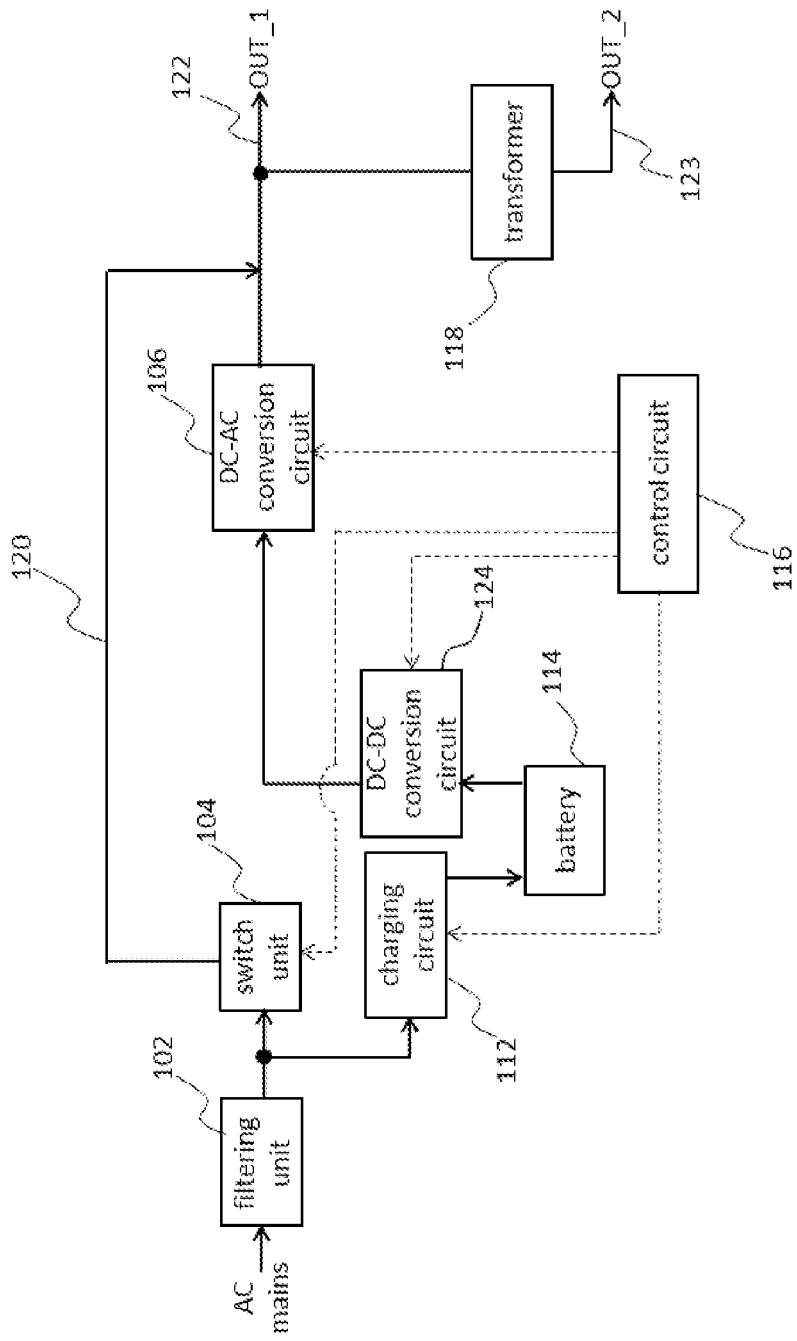
FIG. 2 shows an off-line uninterruptible power system according to another embodiment of the present invention.

FIG. 2 shows an offline uninterruptible power system according to another embodiment of the present invention. Compared with the offline uninterruptible power system shown in FIG. 1, the off-line uninterruptible power system shown in FIG. 2 further adopts a DC-DC conversion circuit 124. The DC-DC conversion circuit 124 is electrically coupled between the battery 114 and the DC-AC conversion circuit 106. In addition, the control circuit 116 is further electrically coupled to the DC-DC conversion circuit 124 for controlling its operation. Although the off-line uninterruptible power systems shown in FIGS. 1 and 2 adopt the filtering units 102, it should be understood by those skilled in the art that whether to adopt the filtering units 102 can be determined according to actual design requirements.

Figure 3:
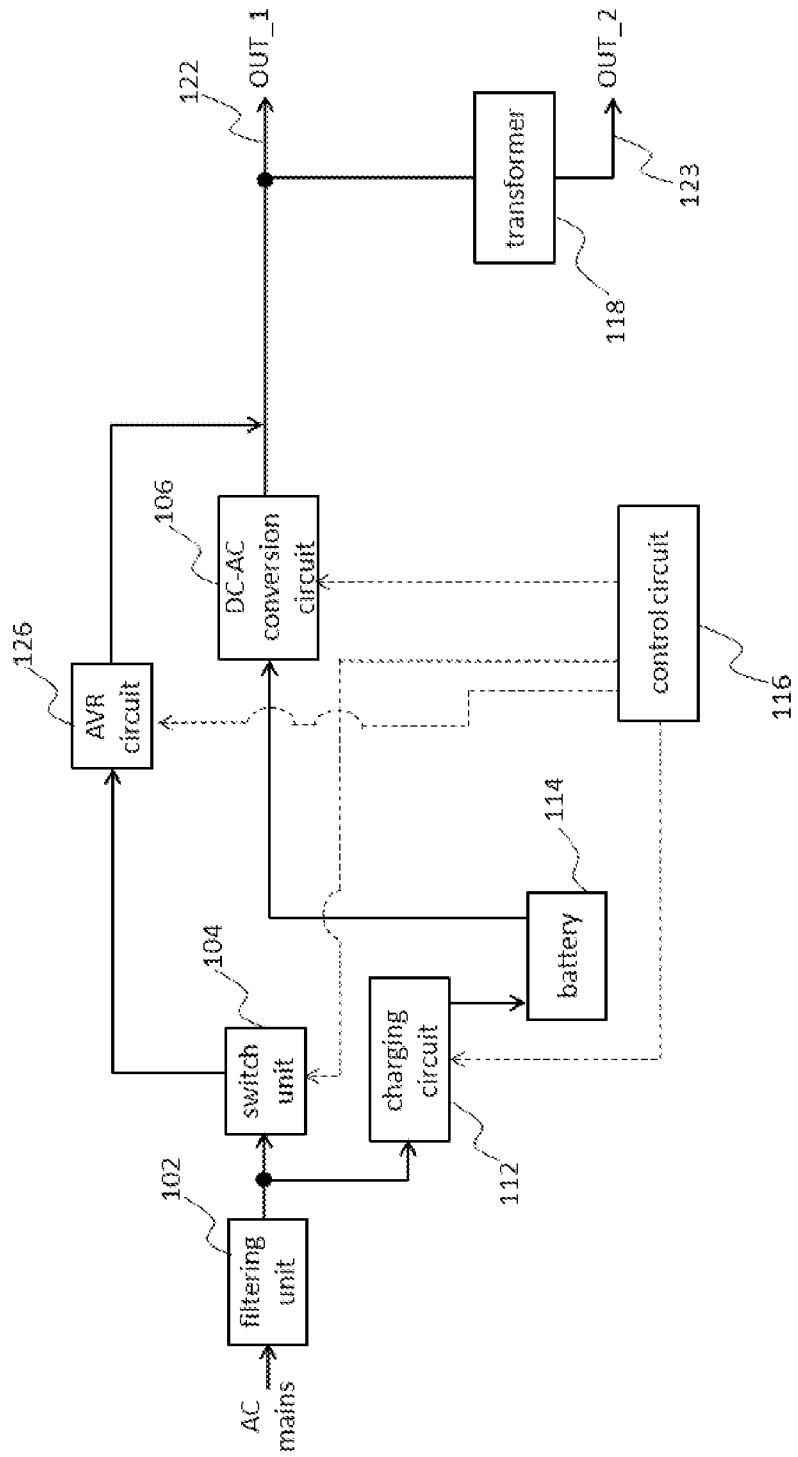
FIG. 3 shows a line-interactive uninterruptible power system according to an embodiment of the present invention.

FIG. 3 shows a line-interactive uninterruptible power system according to an embodiment of the present invention, Referring to FIG. 3, the line-interactive uninterruptible power system comprises a filtering unit 102, a switch unit 104, a DC-AC conversion circuit 106, a charging circuit 112, a battery 114, a control circuit 116, a transformer 118, an output terminal 122, an output terminal 123 and an automatic voltage regulating circuit (AVR circuit) 126. The switch unit 104 is electrically coupled to an AC power source (e.g., 120V AC mains) through the filtering unit 102 and a circuit breaker (e.g., a 15 Amp circuit breaker, not shown) sequentially. The automatic voltage regulating circuit 126 is electrically coupled between the switch unit 104 and the output terminal 122. The charging circuit 112 is electrically coupled to the battery 114, and is electrically coupled to the AC power source through the filtering unit 102 and the circuit breaker sequentially. The charging circuit 112 can be a boost charging circuit, a buck charging circuit or a buck-boost charging circuit. For example, the input voltage, the input current, the output voltage and the output current of the charging circuit 112 can be 120V, 1 Amp, 300V and 0.4 Amp, respectively. For another example, the input voltage, the input current, the output voltage and the output current of the charging circuit 102 can be 120V, 1 Amp, 12V and 10 Amps, respectively.

The DC-AC conversion circuit 106 is electrically coupled between the battery 114 and the output terminal 122. The control circuit 116 is electrically coupled to the switch unit 104, the charging circuit 112, the DC-AC conversion circuit 106 and the automatic voltage regulating circuit 126 for controlling their operations. The output terminal 122 is configured for outputting an AC output OUT_1 with rated output voltage such as 120V, The transformer 118 is configured to receive the AC output OUT_1 from the output terminal 122 and accordingly generate an AC output OUT_2 to the output terminal 123, wherein the voltage level of the AC output OUT_2 is less than the voltage level of the AC output OUT_1. For example, the voltage level of the AC output OUT_2 can be 5%-30% less than the voltage level of the AC output OUT_1. In this embodiment, the voltage level of the AC output OUT_2 is 106V. The output terminal 123 is configured for supplying the AC output OUT_2, with lower voltage level than the said rated output voltage, to at least one electrical device (especially those with resistive load characteristic such as laser printers, not shown).

Figure 4:
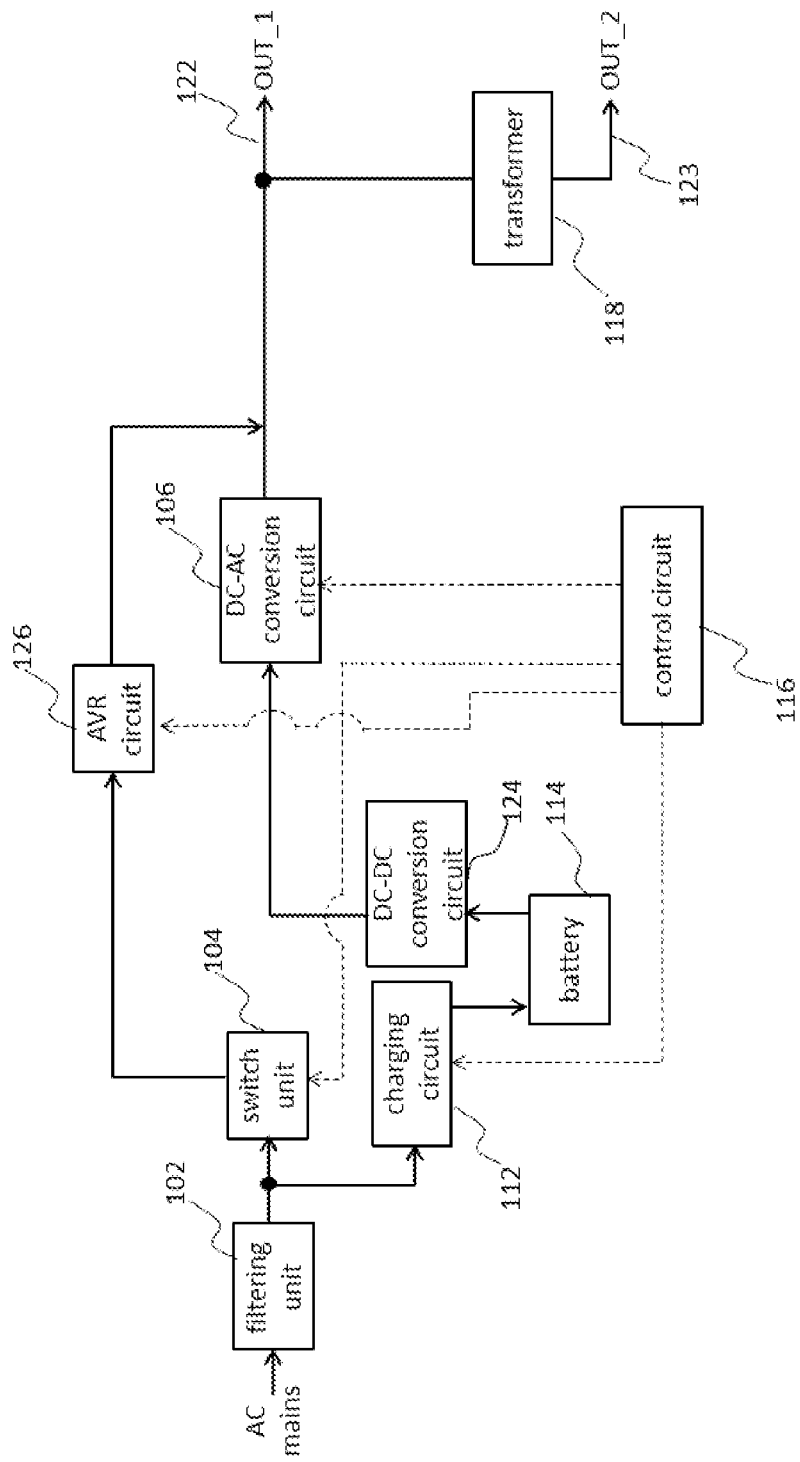
FIG. 4 shows a line-interactive uninterruptible power system according to another embodiment of the present invention.

FIG. 4 shows a line-interactive uninterruptible power system according to another embodiment of the present invention. Compared with the line-interactive uninterruptible power system shown in FIG. 3, the line-interactive uninterruptible power system shown in FIG. 4 further adopts a DC-DC conversion circuit 124. The DC-DC conversion circuit 124 is electrically coupled between the battery 114 and the DC-AC conversion circuit 106. In addition, the control circuit 116 is further electrically coupled to the DC-DC conversion circuit 124 for controlling its operation. Although the line-interactive uninterruptible power systems shown in FIGS. 3 and 4 adopt the filtering units 102, it should be understood by those skilled in the art that whether to adopt the filtering units 102 can be determined according to actual design requirements.

Figure 5:
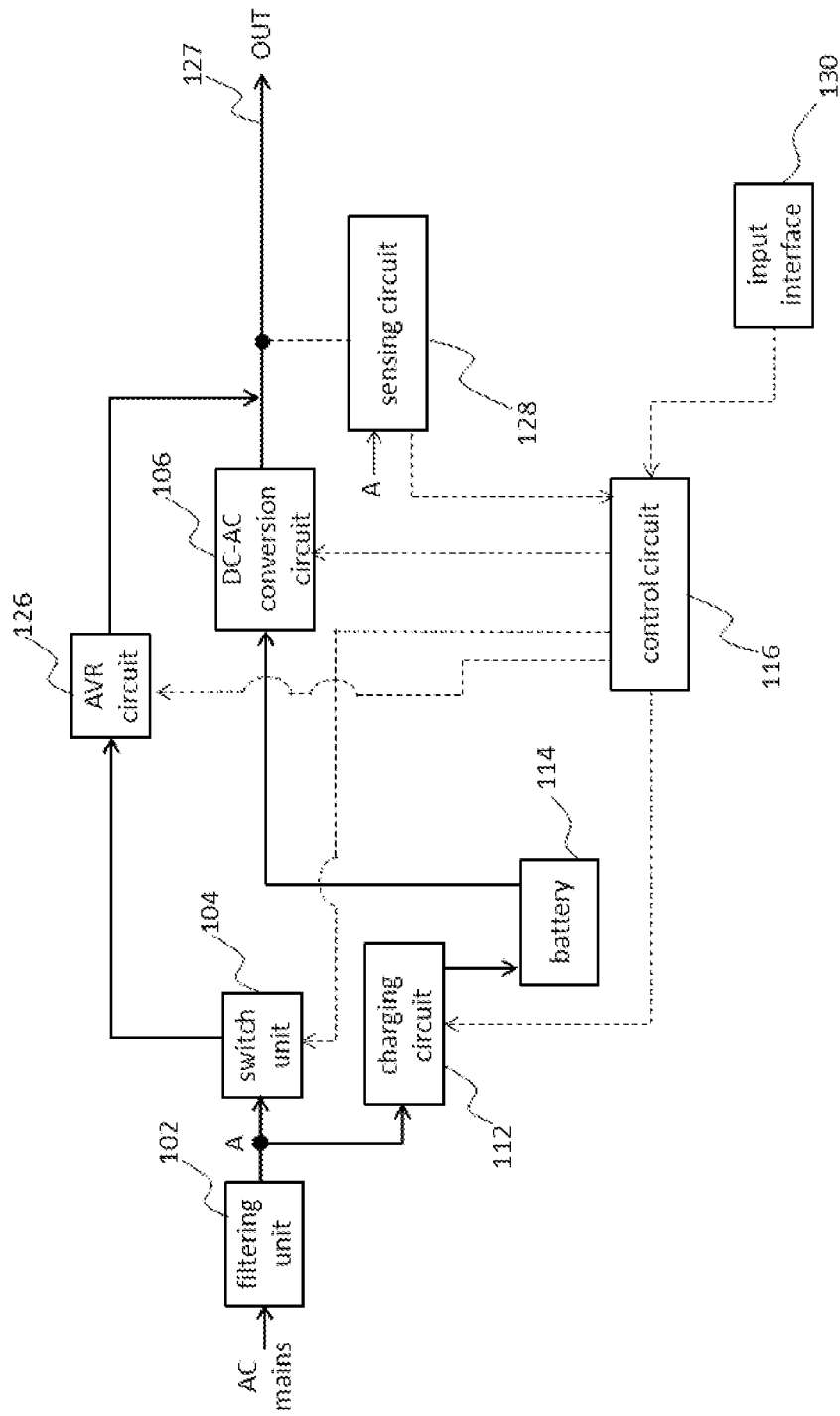
FIG. 5 shows a line-interactive uninterruptible power system according to still another embodiment of the present invention.

FIG. 5 shows a line-interactive uninterruptible power system according to still another embodiment of the present invention. The line-interactive uninterruptible power system shown in FIG. 5 is electrically coupled to an AC power source (e.g., 120V AC mains) through a circuit breaker (not shown). Compared with the line-interactive uninterruptible power system shown in FIG. 3, the line-interactive uninterruptible power system shown in FIG. 5 further adopts a sensing circuit 128 and an input interface 130, and does not adopt the transformer 118 and the output terminal 123. In this embodiment, when the control circuit 116 enters a special mode, the control circuit 116 controls the switch unit 104 to electrically couple the automatic voltage regulating circuit 126 to the filtering unit 102, disables the DC-AC conversion circuit 106, and forces the automatic voltage regulating circuit 126 to enter a buck mode, so that the voltage level of the output of the automatic voltage regulating circuit 126 is less than the voltage level of the input of the automatic voltage regulating circuit 126. For example, the voltage level of the output of the automatic voltage regulating circuit 126 can be 5%-30% less than voltage level of the input of the automatic voltage regulating circuit 126. In this embodiment, the voltage level of the output of the automatic voltage regulating circuit 126 in the special mode is 106V, and the rated output voltage of the line-interactive uninterruptible power system is 120V. Therefore, the output terminal 127 can supply the output of the automatic voltage regulating circuit 126, with lower voltage level than the said rated output voltage, to at least one electrical device (especially those with resistive load characteristic such as laser printers, not shown).

Referring FIG. 5 again, the input interface 130 is electrically coupled to the control circuit 116, and is configured for generating a control signal to the control circuit 116, thereby enabling the control circuit 116 to enter the special mode. The input interface 130 comprises at least one of a button and a touch screen. The sensing circuit 128 is electrically coupled to the output terminal 127, the input terminal of the charging circuit 112 and the control circuit 116. The sensing circuit 128 is configured for sensing the output of the line-interactive uninterruptible power system and generating a sensed data accordingly. The control circuit 116 is further configured to determine whether to enter the special mode according to the sensed data generated by the sensing circuit 128, and the control circuit 116 determines to enter the special mode when the sensed data indicating that the output voltage and the output current are detected at the same time (this means that the electrical devices electrically coupled to the output terminal 127 are resistive loads). However, this manner of determining whether to enter the special mode is not intended to limit the present invention. For example, in still another embodiment, the control circuit 116 determines to enter the special mode when the sensed data indicating that a power factor essentially equals to 1 (this also means that the electrical devices electrically coupled to the output terminal 127 are resistive loads).

In addition, the sensing circuit 128 is further configured for sensing the input A of the charging circuit 112 and generating a sensing result accordingly. In this embodiment, the control circuit 116 determines not to enter the special mode and forces the automatic voltage regulating circuit 126 to enter a bypass mode when the sensing result generated by the sensing circuit 128 indicating that the voltage level of the input A of the charging circuit 112 is lower than a normal voltage level (i.e., lower than 120V in this case). That is, in this ease the voltage levels of the input and output of the automatic voltage regulating circuit 126 equals to each other. It is worth mentioning that the sensing circuit 128 and the input interface 130 can be adopted according to actual design requirements. In addition, when the sensing circuit 128 is adopted, it can be further determined whether to electrically couple the sensing circuit 128 to the input terminal of the charging circuit 112 according to actual design requirements.

Figure 6:
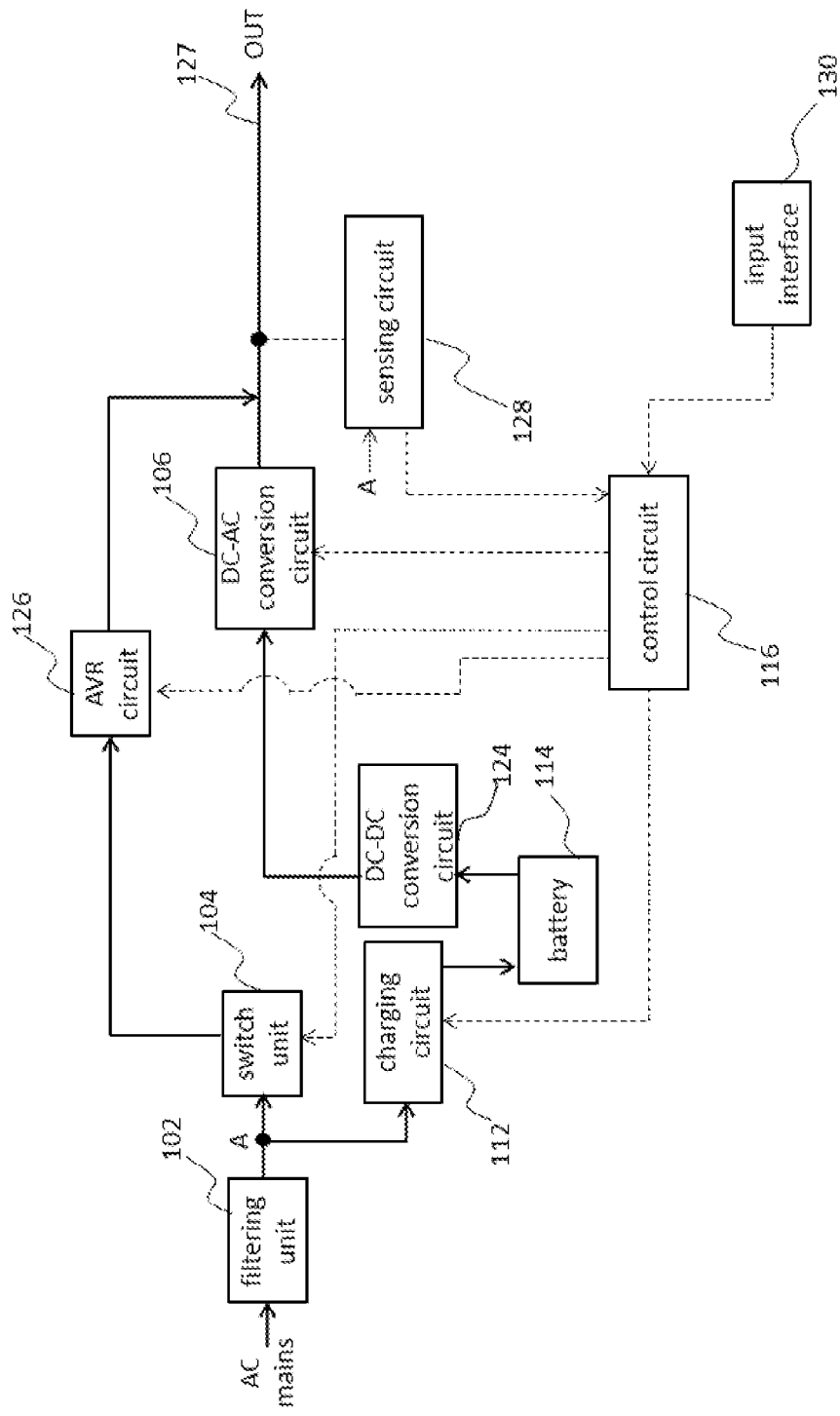
FIG. 6 shows a line-interactive uninterruptible power system according to yet another embodiment of the present invention.

FIG. 6 shows a line-interactive uninterruptible power system according to yet another embodiment of the present invention. Compared with the line-interactive uninterruptible power system shown in FIG. 5, the line-interactive uninterruptible power system shown in FIG. 6 further adopts a DC-DC conversion circuit 124. The DC-DC conversion circuit 124 is electrically coupled between the battery 114 and the DC-AC conversion circuit 106. In addition, the control circuit 116 is further electrically coupled to the DC-DC conversion circuit 124 for controlling its operation. Although the line-interactive uninterruptible power systems shown in FIGS. 5 and 6 adopt the filtering units 102, it should be understood by those skilled in the art that whether to adopt the filtering units 102 can be determined according to actual design requirements.

In summary, since each of the off-line uninterruptible power systems and the line-interactive uninterruptible power systems of the present invention is able to output an AC output with lower voltage level than the rated output voltage, and the resistance of the electrical device with resistive load characteristic is constant, the said electrical device draws lesser current from the uninterruptible power system, thereby preventing the circuit breaker from tripping.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A line-interactive uninterruptible power system, comprising: an output terminal; a battery; a switch unit, electrically coupled to an AC power source; an automatic voltage regulating circuit having an input end and an output end, the input end of the automatic voltage regulating circuit being directly electrically coupled to the switch unit, and the output end of the automatic voltage regulation circuit being directly electrically coupled to the output terminal; a charging circuit, electrically coupled to the AC power source and the battery; a DC-AC conversion circuit having an input end and an output end, the input end of the DC-AC conversion circuit being directly electrically coupled to the battery, and the output end of the automatic voltage regulation circuit being directly electrically coupled to the output terminal and the output end of the automatic voltage regulating circuit; and a control circuit, electrically coupled to the switch unit, the charging circuit, the DC-AC conversion circuit and the automatic voltage regulating circuit for controlling their operations; wherein when the control circuit is in a special mode, the control circuit controls the switch unit to electrically couple the automatic voltage regulating circuit to the AC power source, disables the DC-AC conversion circuit, and forces the automatic voltage regulating circuit to enter a buck mode to lower the voltage level of the output of the automatic voltage regulating circuit to under a rated output voltage of the line-interactive uninterruptible power system.

2. The line-interactive uninterruptible power system as claimed in claim 1, wherein the voltage level of the output of the automatic voltage regulating circuit is 5%-30% less than the voltage level of the rated output voltage of the line-interactive uninterruptible power system.

3. The line-interactive uninterruptible power system as claimed in claim 1, further comprising a DC-DC conversion circuit electrically coupled between the battery and the DC-AC conversion circuit, wherein the control circuit is further electrically coupled to the DC-DC conversion circuit for controlling its operation.

4. The line-interactive uninterruptible power system as claimed in claim 1, further comprising a filtering unit, wherein the switch unit and the charging circuit are electrically coupled to the AC power source through the filtering unit.

5. The line-interactive uninterruptible power system as claimed in claim 1, further comprising an input interface for generating a control signal to the control circuit, thereby enabling the control circuit to enter the special mode.

6. The line-interactive uninterruptible power system as claimed in claim 5, wherein the input interface comprises at least one of a button and a touch screen.

7. The line-interactive uninterruptible power system as claimed in claim 1, wherein the control circuit is further configured to determine whether to enter the special mode according to a sensed data of a sensing circuit configured for sensing the output of the line-interactive uninterruptible power system, and the control circuit determines to enter the special mode when the sensed data indicating that the output voltage and the output current are detected at the same time.

8. The line-interactive uninterruptible power system as claimed in claim 1, wherein the control circuit is further configured to determine whether to enter the special mode according to a sensed data of a sensing circuit configured for sensing the output of the line-interactive uninterruptible power system, and the control circuit determines to enter the special mode when the sensed data indicating that a power factor essentially equals to 1.

9. The line-interactive uninterruptible power system as claimed in claim 7, wherein the sensing circuit is further configured for sensing the input of the charging circuit, and the control circuit determines not to enter the special mode and forces the automatic voltage regulating circuit to enter a bypass mode when the sensing result of the input of the charging circuit indicating that the voltage level of the input of the charging circuit is lower than a normal voltage level.

10. The line-interactive uninterruptible power system as claimed in claim 8, wherein the sensing circuit is further configured for sensing the input of the charging circuit, and the control circuit determines not to enter the special mode and forces the automatic voltage regulating circuit to enter a bypass mode when the sensing result of the input of the charging circuit indicating that the voltage level of the input of the charging circuit is lower than a normal voltage level.

11. The line-interactive uninterruptible power system as claimed in claim 3, further comprising an input interface for generating a control signal to the control circuit, thereby enabling the control circuit to enter the special mode.

12. The line-interactive uninterruptible power system as claimed in claim 3, wherein the control circuit is further configured to determine whether to enter the special mode according to a sensed data of a sensing circuit configured for sensing the output of the line-interactive uninterruptible power system, and the control circuit determines to enter the special mode when the sensed data indicating that the output voltage and the output current are detected at the same time.

13. The line-interactive uninterruptible power system as claimed in claim 3, wherein the control circuit is further configured to determine whether to enter the special mode according to a sensed data of a sensing circuit configured for sensing the output of the line-interactive uninterruptible power system, and the control circuit determines to enter the special mode when the sensed data indicating that a power factor essentially equals to 1.

* * * * *